US008624916B2

(12) United States Patent
Kulshrestha et al.

(10) Patent No.: US 8,624,916 B2
(45) Date of Patent: Jan. 7, 2014

(54) PROCESSING GLOBAL ATOMIC OPERATIONS USING THE BENDING UNIT DATAPATH

(71) Applicant: NVIDIA Corporation, Santa Clara, CA (US)

(72) Inventors: Narayan Kulshrestha, Fremont, CA (US); Adam Paul Dreyer, Portland, OR (US); Chad D. Walker, San Jose, CA (US); Rui M. Bastos, Porto Alegra (BR)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/854,274

(22) Filed: Apr. 1, 2013

(65) Prior Publication Data
US 2013/0293564 A1 Nov. 7, 2013

Related U.S. Application Data

(62) Division of application No. 12/569,743, filed on Sep. 29, 2009, now Pat. No. 8,411,103.

(51) Int. Cl.
G06T 1/00 (2006.01)
G06F 13/00 (2006.01)
G09G 5/36 (2006.01)
G06F 12/00 (2006.01)
G06F 15/00 (2006.01)
G06F 9/00 (2006.01)
G06K 9/60 (2006.01)
H04N 1/46 (2006.01)
G03F 3/08 (2006.01)

(52) U.S. Cl.
USPC ........... 345/589; 345/522; 345/530; 345/538; 345/545; 345/556; 382/305; 382/307; 711/1; 711/100; 711/155; 712/1; 712/205; 712/223; 712/225; 358/518; 358/524

(58) Field of Classification Search
USPC ......... 345/428, 581, 589, 501, 519, 522, 530, 345/538–539, 543, 555–557, 561, 564–565, 345/630; 700/1, 7; 711/1, 3, 100, 118, 125, 711/155, 200; 708/231–236; 712/1, 16–18, 712/25, 27–28, 200, 205, 214, 220–226; 358/515–519, 524–525; 382/162, 167, 382/305–307
See application file for complete search history.

(56) References Cited

U.S. PATENT DOCUMENTS

| 5,826,089 | A  | * | 10/1998 | Ireton .......................... 717/146 |
| 5,940,311 | A  | * | 8/1999 | Dao et al. ..................... 708/204 |
| 6,075,942 | A  | * | 6/2000 | Cartwright, Jr. .............. 717/138 |
| 8,108,610 | B1 | * | 1/2012 | Glasco et al. ................. 711/118 |
| 8,135,926 | B1 | * | 3/2012 | Glasco et al. ................. 711/155 |
| 8,233,004 | B1 | * | 7/2012 | Molnar et al. ................ 345/581 |
| 8,411,103 | B1 | * | 4/2013 | Kulshrestha et al. ......... 345/589 |

* cited by examiner

Primary Examiner — Wesner Sajous
(74) Attorney, Agent, or Firm — Patterson & Sheridan, L.L.P.

(57) ABSTRACT

One embodiment of the invention sets forth a CROP configured to perform both color raster operations and atomic transactions. Upon receiving an atomic transaction, the distribution unit within the CROP transmits a read request to the L2 cache for retrieving the destination operand. The distribution unit also transmits the source operands and the operation code to the latency buffer for storage until the destination operand is retrieved from the L2 cache. The processing pipeline transmits the operation code, the source and destination operands and an atomic flag to the blend unit for processing. The blend unit performs the atomic transaction on the source and destination operands based on the operation code and returns the result of the atomic transaction to the processing pipeline for storage in the internal cache. The processing pipeline writes the result of the atomic transaction to the L2 cache for storage at the memory location associated with the atomic transaction.

16 Claims, 7 Drawing Sheets

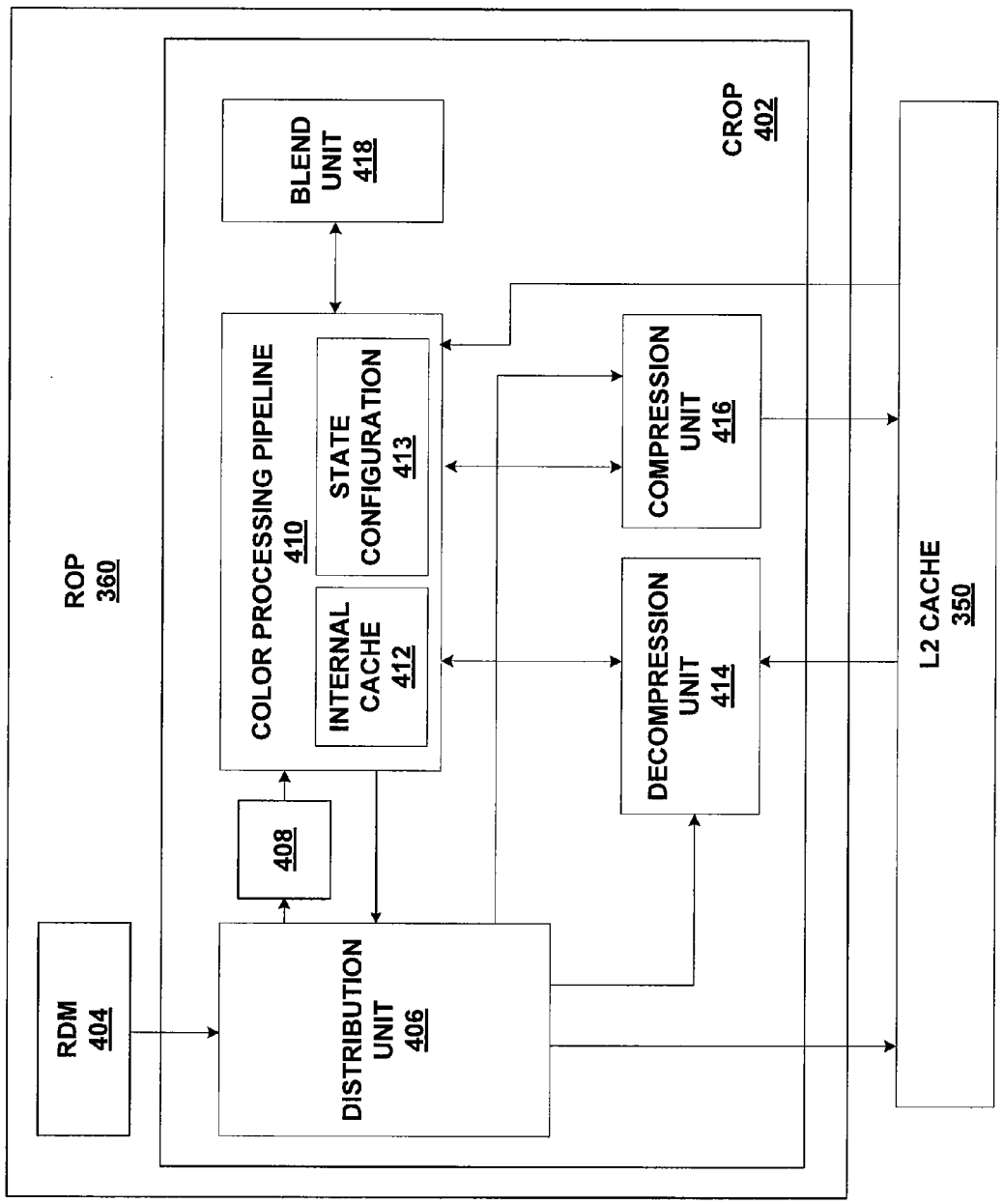

PROCESSING GLOBAL ATOMIC OPERATIONS USING THE BENDING UNIT DATAPATH

CROSS-REFERENCE TO RELATED APPLICATIONS

This application is a divisional of co-pending U.S. patent application Ser. No. 12/569,743, filed Sep. 29, 2009, which is hereby incorporated herein by reference.

BACKGROUND OF THE INVENTION

1. Field of the Invention

The present invention relates generally to the field of graphics processing and, more specifically, to processing global atomic operations using the color raster operations unit (CROP).

2. Description of the Related Art

A graphics processing unit (GPU) is a specialized processor that is configured to efficiently process complex graphics and other numerical computations. Each GPU has several on-chip hardware components, such as memory caches and logic operations units, configured to efficiently perform the graphics and numerical computations. In typical computing systems, graphics processing and other computationally-intensive operations are off-loaded by the central processing unit (CPU) to the GPU.

Operations performed by the GPU often include atomic transactions associated with specific memory locations. An atomic transaction associated with a memory location is a type of read-modify-write (RMW) operation. In an RMW operation, the value stored in the associated memory location is read and modified based on a computation operation and then the modified value is written back at the associated memory location. When the atomic transaction is in progress, the memory state of the associated memory location is preserved until that atomic transaction is complete.

Typically, dedicated hardware units configured only to execute atomic transactions are included in the GPU. However, one drawback of such hardware design is that area on the GPU chip is consumed by each dedicated hardware unit which only executes atomic transactions. Further, the throughput of the atomic transactions is dependent on the number of dedicated hardware units included in the GPU. Therefore, to achieve acceptable throughput of atomic transactions, a large portion of the area available on the GPU chip is required to include several such dedicated hardware units.

As the foregoing illustrates, what is needed in the art is a mechanism for efficiently processing atomic transactions without consuming a significant portion of area available on the GPU chip.

SUMMARY OF THE INVENTION

One embodiment of the present invention sets forth a method for processing atomic transactions within a processing subsystem configured to perform both color blending operations and atomic transactions. The method includes the steps of receiving an atomic transaction that includes an operation code, one or more source operands and a memory address associated with a memory location within a memory unit that stores a destination operand, retrieving the destination operand from the memory unit, transmitting the operation code, one or more source operands, destination operand and an atomic flag to a processing unit within the processing subsystem, wherein the atomic flag indicates that the operation code is associated with the atomic transaction, processing the one or more source operands and the destination operand based on the operation code to produce an atomic transaction result, and transmitting the atomic transaction result to the memory unit for storage at the memory address included in the atomic transaction.

One advantage of the disclosed method is that the hardware units within the CROP that are configured to perform color raster operations, such as blending operations, are also configured to perform atomic transactions. Such a design saves valuable die space since dedicated hardware for processing atomic transactions is not needed

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a detailed block diagram of a color raster operations unit (CROP) within the ROP of FIG. 3B, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
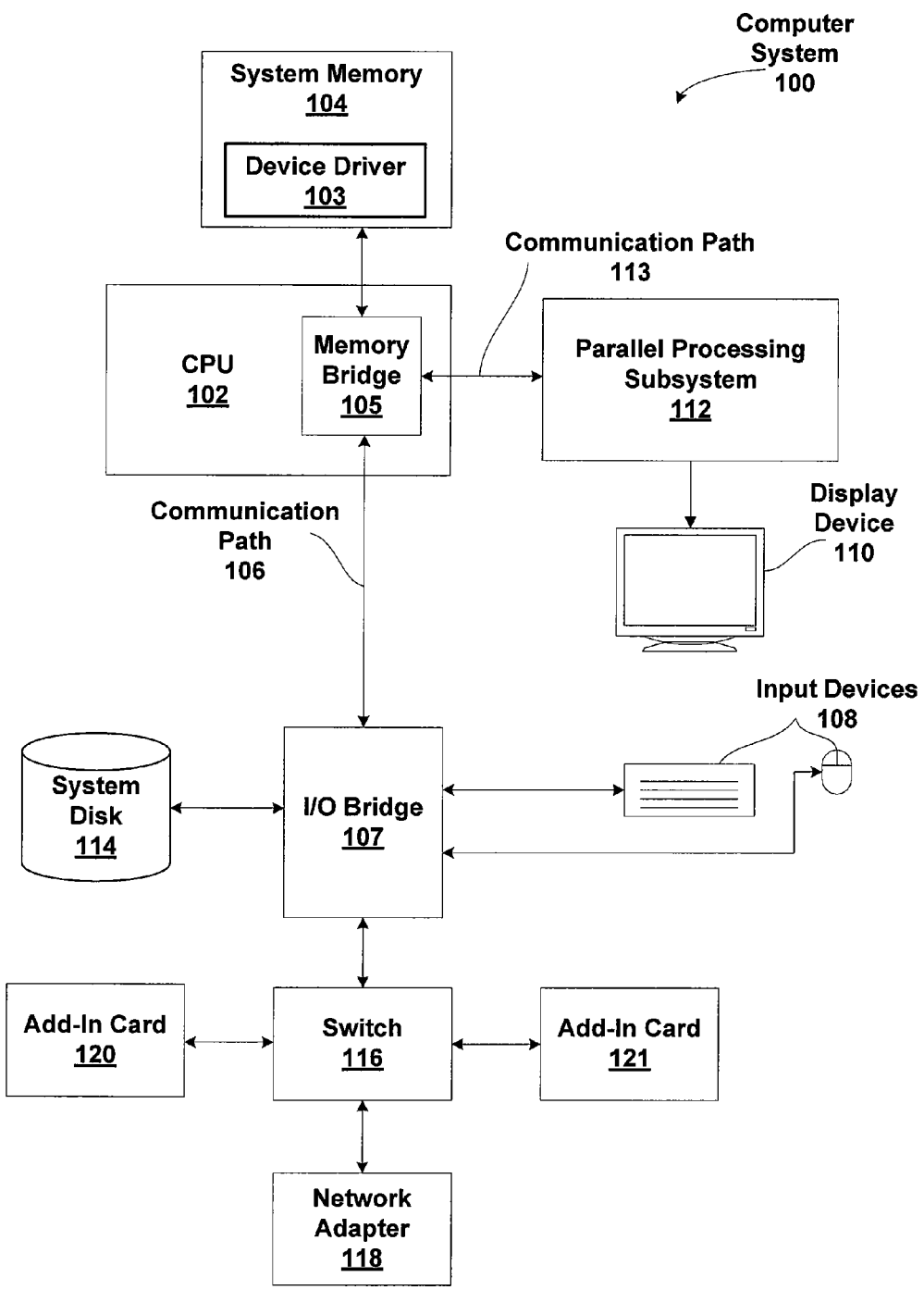
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
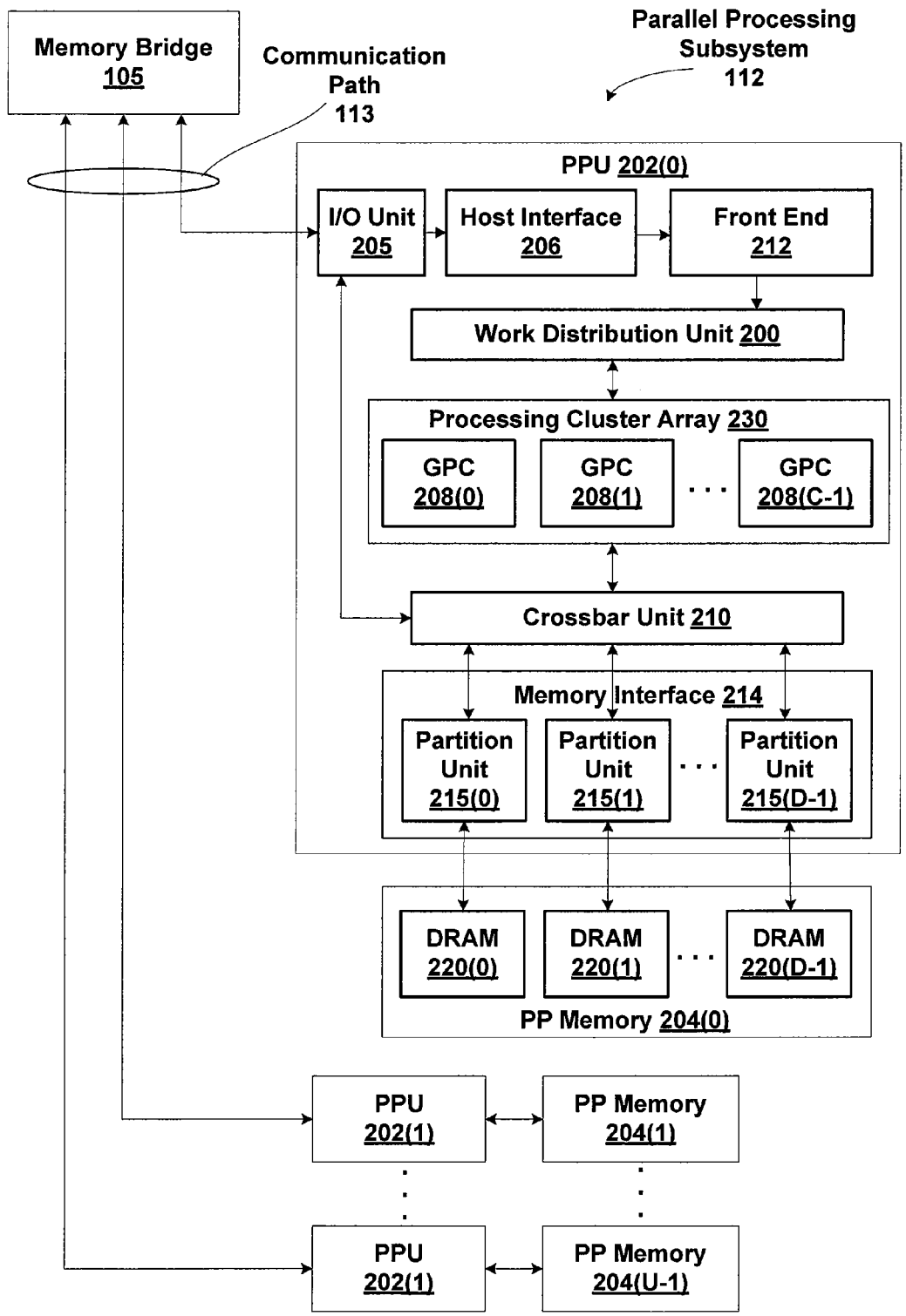
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
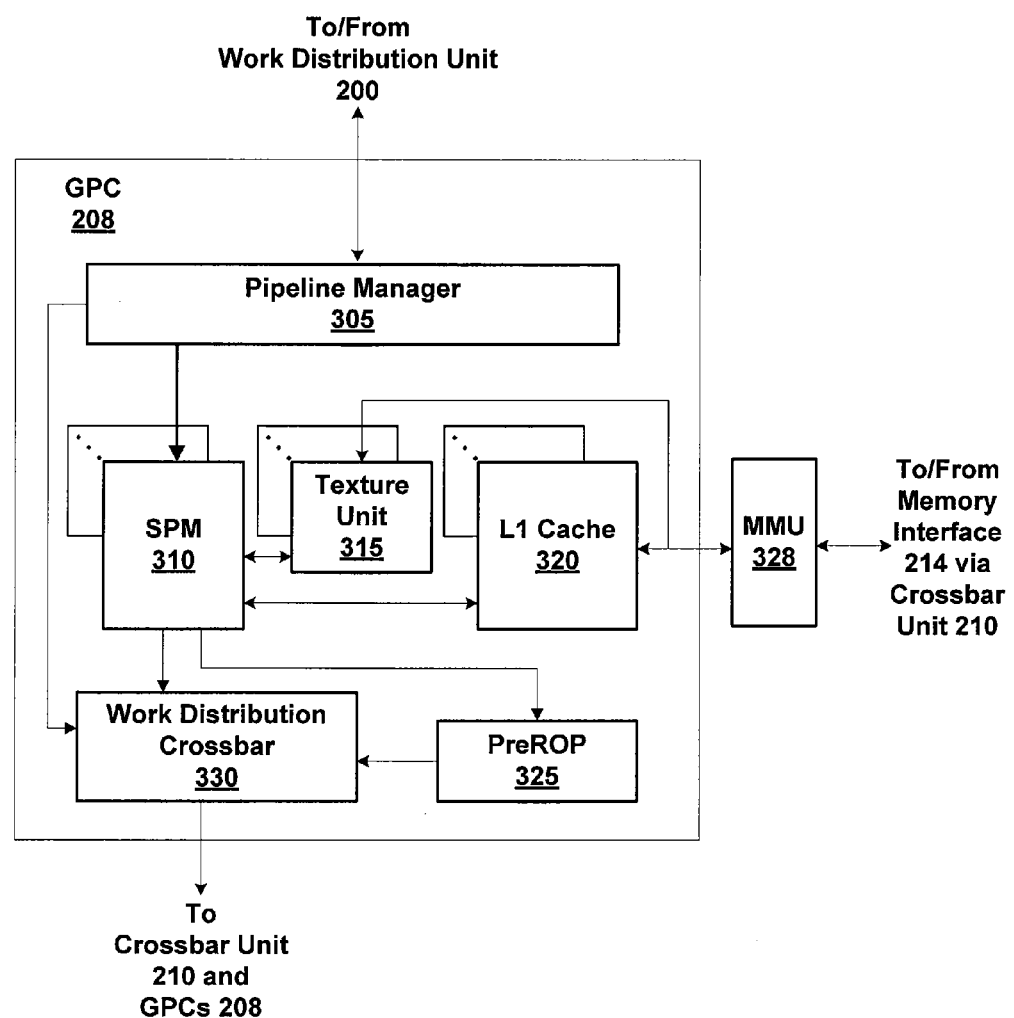
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
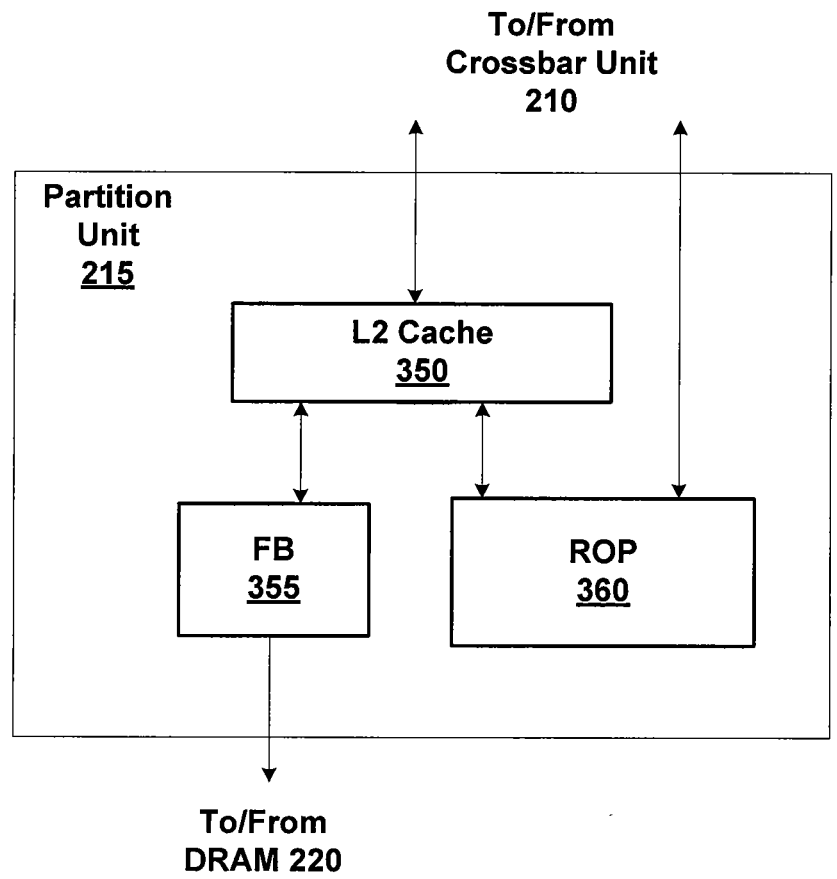
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Processing Atomic Operations within the CROP

FIG. 4 is a detailed block diagram of a color raster operations unit (CROP) 402 within the ROP 360 of FIG. 3B, according to one embodiment of the present invention. As shown, the ROP 360 includes the CROP 402 and the ROP data manager 404, and the CROP 402 includes a distribution unit 406, a latency buffer 408, a color processing pipeline 410 that includes an internal cache 412 and state configuration 413, a decompression unit 414, a compression unit 416 and a blend unit 418. In operation, the CROP 402 performs both color raster operations and atomic transactions based on commands and data received from the ROP data manager 404.

When performing color raster operations, the CROP 402 performs single source pixel blending or dual source pixel blending. For single source pixel blending, the ROP data manager 404 transmits one unit of source pixel data to the distribution unit 406. The distribution unit 406 first determines whether additional pixel data (referred to herein as "destination pixel data") needed to perform the color raster operations on the source pixel data is stored in the internal cache 412. If the destination pixel data is available in the internal cache 412, then the distribution unit 406 transmits the source pixel data to the color processing pipeline 410, which in turn, transmits the source pixel data and the destination pixel data stored in the internal cache 412 to the blend unit 418 for processing based on the state configuration 413.

The blend unit 418 performs the single source pixel blending operation on the source pixel data and the destination pixel data. The blending operations performed by the blend unit 418 are represented by the following blending equation:

$$\text{source\_color} \times \text{source\_blending\_coefficient} + \text{dest\_color} \times \text{dest\_blending\_coefficient} \quad \text{(i)}$$

where the source_color and dest_color are included in the source pixel data and the destination pixel data, respectively. The blend unit 418 transmits the result of the blending operation to the color processing pipeline 410 for storage in the internal cache 412. The color processing pipeline 410 then transmits the result of the blending operation to the compression unit 416. The compression unit 416 optionally compresses the result of the blending operation based on a pre-determined compression format and transmits the compressed result to the L2 cache unit 350 for storage.

If the destination pixel data is not available in the internal cache 412, then the distribution unit 406 first transmits a read request to the L2 cache unit 350 requesting the destination pixel data. The distribution unit 406 then stores the source pixel data in the latency buffer 408 until the destination pixel data is retrieved from the L2 cache unit 350. The L2 cache unit 350 returns the requested destination pixel data to the decompression unit 414 that optionally decompresses the requested destination pixel data based on a pre-determined compression format. The decompression unit 414 transmits the decompressed destination pixel data to the color processing pipeline 410. Concurrently, the color processing pipeline 410 retrieves the source pixel data from the latency buffer 408. The color processing pipeline 410 then transmits the source pixel data and destination pixel data to the blend unit 418 for processing, as previously described herein.

For dual source pixel blending, the ROP data manager 404 transmits two units of source pixel data to the distribution unit 406. The dual source pixel blending operation is performed in the same manner as the single source pixel blending operation described above, except that different blending coefficients are applied to source and destination color included in each unit of source or destination pixel data, respectively.

The different elements within the CROP 402 configured to perform color raster operations are also be configured to perform atomic transactions. As is well-known, most atomic transactions are read-modify-write operations where a memory location is read, the value stored in the memory location is processed, and the resulting value is stored in the same memory location, overwriting the value from the memory location. The SPM 310 transmits two types of atomic transactions, atomic operations and reduction operations, to the ROP data manager 404 via the L2 cache unit 350 for processing within the CROP 402.

An atomic operation transmitted by the SPM 310 typically includes one or more source data units (referred to herein as "source operands"), a memory address associated with a memory location in the L2 cache unit 350 storing a destination data unit (referred to herein as "destination operand") and an operation code specifying the type of atomic operation to be performed on the source and destination operands. With an atomic operation the result of the atomic operation is stored at the memory location associated with the memory address and the destination operand is returned to the SPM 310. A reduction operation transmitted by the SPM 310 is similar to an atomic operation except that the destination operand is not returned to the SPM 310.

Table 1 shows a subset of different types of atomic operations and reduction operations that are transmitted by the SPM 310 to the ROP data manager 404 for processing within the CROP 402. In Table 1, "A" represents the destination operand, "B" and "C" represent different source operands and "D" represents the destination operand that is returned to the SPM 310.

TABLE 1

| Operation Code | Function |
| --- | --- |
| IMIN | A = (A < B) ? A:B |
| IMAX | A = (A > B) ? A:B |

TABLE 1-continued

| Operation Code | Function |
| --- | --- |
| INC | A = (A >= B) ? 0:A + 1 |
| DEC | A = (A = 0 \|\| A > B) ? B:A − 1 |
| IADD | A = A + B |
| IMUL | A = A * B |
| IAND | A = A & B |
| IOR | A = A \| B |
| IXOR | A = A ^ B |
| CAS | if (A == B):A = C |
| EXCH | A = B |
| GLD_GST | if (reduction operation) A = B:D = A |
| FADD | A = A + B |
| FMIN | A = (A < B) ? A:B |
| FMAX | A = (A > B) ? A:B |
| FMUL | A = A * B |
| Atomic: D = A; A = A gop {B, C} | Reduction: A = A gop {B, C} |

In operation, the ROP data manager 404 transmits atomic transactions received from the SPM 310 to the distribution unit 406. As with blending operations, the distribution unit 406 first determines whether the destination operand is available within the internal cache 412.

If the destination operand is available in the internal cache 412, then the distribution unit 406 transmits the one or more source operands to the color processing pipeline 410. The color processing pipeline 410 then transmits the source operands, the destination operand, the operation code and an atomic flag indicating that an atomic transaction is being processed to the blend unit 418 for processing. The blend unit 418 detects that the received operation is an atomic transaction based on the atomic flag and processes the source operands and the destination operand based on the operation code. If the operation code of the atomic transaction is IADD or FADD, then the blend unit 418 adjusts the source blending coefficient and the destination blending coefficient in the blending equation previously described herein. If the operation code of the atomic transaction is INC or DEC, then the blend unit 418 adjusts the source and/or destination colors and/or blending coefficients appropriately. For some of the remaining operation codes, the blend unit 418 processes the source operands and the destination operands using logic gates and/or MUXers already available within the blend unit 418 for processing color raster operations. For other operation codes, such as AND, OR and XOR, supplementary logic gates and MUXers are added to the blend unit 418 for handling those operation codes. Persons skilled in the art will recognize that other types of atomic and reduction operations not shown in Table 1 can be processed by the CROP 402 in a similar fashion. Once the atomic transaction is processed, the blend unit 418 transmits the result of the atomic transaction to the color processing pipeline 410 for storage within the internal cache 412.

The color processing pipeline 410 transmits the result of the atomic transaction to the L2 cache unit 350 via the compression unit 416 for storage at the memory location associated with the atomic transaction. In one embodiment, because the state configuration 413 indicates that the compression mode is disabled when processing atomic transactions, the compression unit 416 writes the result of the atomic transaction to the L2 cache unit 350 without performing any compression operations. In an alternative embodiment, the compression unit 416 performs compression operations on the result of the atomic transaction and then writes the compressed result of the atomic transaction to the L2 cache unit 350. In cases where the processed atomic transaction is an atomic operation, the destination operand is also transmitted to the L2 cache unit 350 via the compression unit 416. The L2 cache unit 350 then transmits the destination operand to the SPM 310.

In one embodiment, the L2 cache unit 350 transmits an acknowledgement to the color processing pipeline 410 indicating the receipt of the result of the atomic transaction.

If the destination operand is not available in the internal cache 412, then the distribution unit 406 transmits a read request to the L2 cache unit 350 requesting the destination operand from the memory location associated with the atomic transaction. The distribution unit 406 then stores the source operands and operation code included in the atomic transaction in the latency buffer 408 until the destination operand is retrieved from the L2 cache unit 350. In one embodiment, because the state configuration 413 indicates that the compression mode is disabled when processing atomic transactions, upon receiving the requested destination operand from the L2 cache unit 350, the decompression unit 414 transmits the destination operand to the color processing pipeline 410 without performing any decompression operations. In an alternative embodiment, the decompression unit 414 decompresses the destination operand received from the L2 cache unit 350 if the destination operand is compressed. The color processing pipeline 410, concurrently, retrieves the source operands stored from the latency buffer 408. The color processing pipeline 410 then transmits the source operands, the destination operand, the operation code and an atomic flag indicating that an atomic transaction is being processed to the blend unit 418 for processing, as previously described herein.

In an alternative embodiment, the source operands and operation code included in the atomic transaction are buffered in a different buffering unit within the ROP 360 while the destination operand is retrieved from the L2 cache unit 350. In such an embodiment, the CROP 402 may not include the latency buffer 408 specific for storing the source operands and the operation code. In another alternative embodiment, the destination operand is retrieved from the cproc pipeline stages or a different storage unit within the GPC 208 when the destination operand is not available in the internal cache 412.

In one embodiment, the L2 cache unit 350 also transmits load and store requests received from the SPM 310 that are associated with memory addresses included in previously transmitted atomic transactions that have not been processed by the CROP 402 to the ROP data manager 404. The load requests are processed by the CROP 402 as atomic operations and the store requests are processed by the CROP 402 as reduction operations.

Figure 5A:
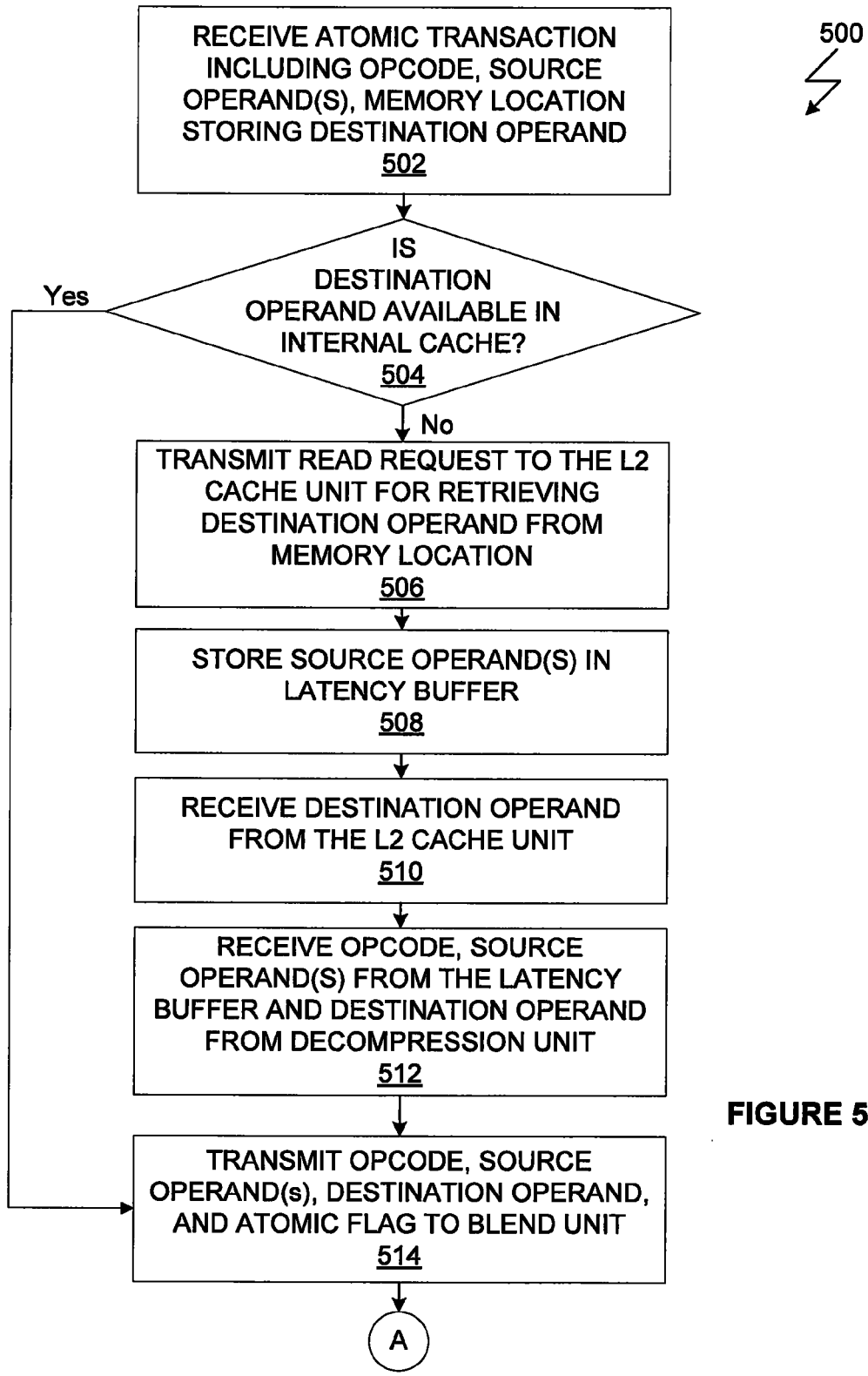
FIGS. 5A and 5B set forth a flow diagram of methods steps for processing an atomic transaction within the CROP, according to one embodiment of the present invention.
Figure 5B:
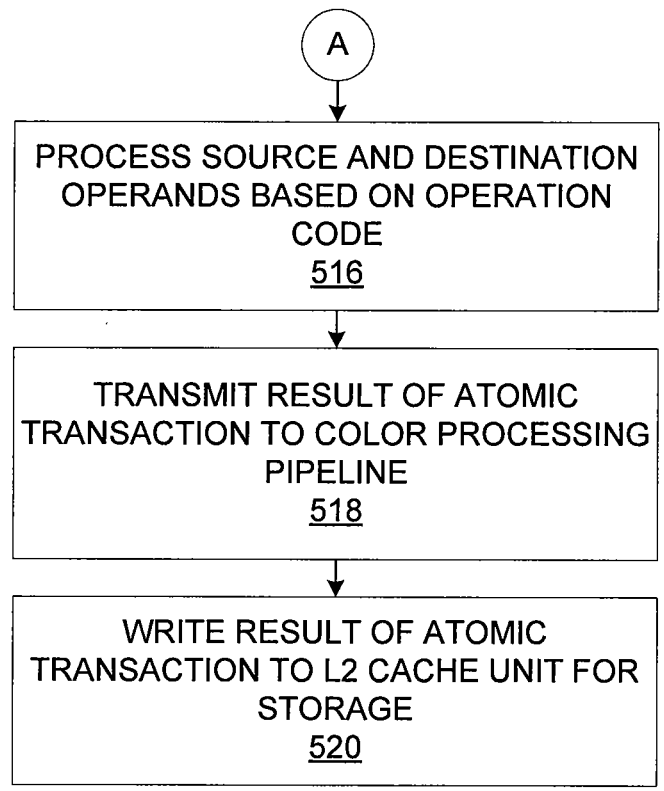

FIGS. 5A and 5B set forth a flow diagram of methods steps for processing an atomic transaction within the CROP, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502, where the distribution unit 406 receives an atomic transaction from the ROP data manager 404. The atomic transaction includes an operation code, one or more source operands and a memory location associated with a memory location in the L2 cache unit 350 storing the destination operand. At step 504, the distribution unit 406 determines whether the destination operand is available in the internal cache 412 within the color processing pipeline 410.

If the destination operand is not available within the internal cache 412, then, at step 506, the distribution unit 406 transmits a read request to the L2 cache unit 350 requesting the destination operand stored at the memory location associated with the atomic transaction. At step 508, the distribution unit 408 transmits the source operands and the operation code to the latency buffer 408 until the destination operand is retrieved from the L2 cache unit 350. At step 510, the decompression unit 414 receives the destination operand from the L2 cache unit 350. In one embodiment, because the L2 cache unit 350 transmits decompressed destination operands of atomic transactions to the decompression unit 414, the decompression unit 414 does not perform any decompression operations.

At step 512, the color processing pipeline 410 receives the destination operand from the decompression unit 414 and the source operands and the operation code from the latency buffer 408. At step 514, the color processing pipeline 410 transmits the source operands, the destination operand, the operation code and an atomic flag indicating that an atomic transaction is being processed to the blend unit 418 for processing. At step 516, the blend unit 418 detects that the received operation is an atomic transaction and processes the source operands and the destination operands based on the operation code. At step 518, the blend unit 418 transmits the result of the atomic transaction to the color processing pipeline 410 for storage in the internal cache 412. At step 520, the color processing pipeline 410 writes the result of the atomic transaction to the L2 cache unit 350 for storage at the memory location associated with the atomic transaction. In the case of an atomic transaction, the color processing pipeline 410 also transmits the destination operand to the L2 cache unit 350 for transmission to the SPM 310.

Referring back to step 504, if the destination operand is available within the internal cache 412, then the method 500 proceeds directly to step 514, previously described herein.

In sum, the CROP is configured to process both color raster operations and atomic transactions received from the ROP data manager. An atomic transaction includes one or more source operands, a memory address associated with a memory location storing a destination operand and an operation code specifying the type of atomic transaction to be performed on the source and destination operands. Upon receiving an atomic transaction, the distribution unit first transmits a read request to the L2 cache unit for retrieving the destination operand from the memory location associated with the memory address included in the atomic transaction. The distribution unit also transmits the source operands and the operation code to the latency buffer for storage until the destination operand is retrieved from the L2 cache unit.

The distribution unit transmits the destination operand received form the L2 cache unit via the decompression unit to the color processing pipeline. Simultaneously, the source operands and the operation code stored in the latency buffer are also transmitted to the color processing pipeline. The color processing pipeline then transmits the operation code, the source and destination operands and an atomic flag to the blend unit for further processing. The blend unit performs the atomic transaction on the source and destination operands and returns the result of the atomic transaction to the color processing pipeline for storage in the internal cache. The color processing pipeline then writes the result of the atomic transaction to the L2 cache unit for storage at the memory location associated with the atomic transaction.

One advantage of the techniques described herein is that the hardware units within the CROP that are configured to perform color raster operations, such as blending operations, are also configured to perform atomic transactions. Such a design saves valuable die space since dedicated hardware for processing atomic transactions is not needed. Further, because the CROP processes both color raster operations and atomic transactions efficiently, the overall throughput of the system is increased.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A raster operations unit, comprising:
    a data manager configured to:
        receive an atomic transaction that includes an operation code, one or more source operands and a memory address associated with a memory location within a memory unit that stores a destination operand; and
    a color raster operations unit including:
        a color processing pipeline including an internal cache unit;
        a distribution unit configured to:
            receive the atomic transaction from the data manager,
            determine whether the destination operand is stored in the internal cache unit, and
            transmit the operation code, the one or more source operands and the destination operand to the color processing pipeline; and
        a blend unit configured to:
            receive the operation code, one or more source operands, destination operand and an atomic flag from the color processing pipeline, wherein the atomic flag indicates that the operation code is associated with the atomic transaction,
            process the one or more source operands and the destination operand based on the operation code to produce an atomic transaction result, and
            transmit the atomic transaction result to the color processing pipeline for storage in the internal cache unit,
        wherein the color processing pipeline is configured to transmit the result of the atomic transaction to an intermediate cache unit for storage at the memory location.

2. The raster operations unit of claim 1, wherein the distribution unit is further configured to retrieve the destination operand from the intermediate cache unit when the destination operand is not stored in the internal cache unit.

3. The raster operations unit of claim 2, wherein the distribution unit is further configured to transmit a read request to the intermediate cache unit that requests the destination operand stored at the memory location.

4. The raster operations unit of claim 3, wherein the color raster operations unit includes a latency buffer and the distribution unit is further configured to store the one or more source operands and the operation code in the latency buffer until the destination operand is retrieved from the memory unit.

5. The raster operations unit of claim 1, wherein the color processing pipeline is further configured to retrieve the destination operand from the internal cache unit when the destination operand is stored in the internal cache unit.

6. The raster operations unit of claim 1, wherein the atomic transaction is an atomic operation, and the color processing pipeline is further configured to transmit the destination operand to the memory unit for transmission to the processing unit.

7. The raster operations unit of claim 1, wherein the blend unit is further configured to apply a blending equation to the one or more source operands and the destination operand, and wherein the blending equation includes one or more source coefficients and a destination coefficient.

8. The raster operations unit of claim 7, wherein the blend unit is further configured to adjust the values of the one or more source operands, the destination operand, the one or more source coefficients and the destination coefficient based on the operation code.

9. A computing system, comprising:
a processing unit;
a memory unit; and
a raster operations unit, comprising:
  a data manager configured to:
    receive an atomic transaction that includes an operation code, one or more source operands and a memory address associated with a memory location within a memory unit that stores a destination operand; and
  a color raster operations unit including:
    a color processing pipeline including an internal cache unit;
    a distribution unit configured to:
      receive the atomic transaction from the data manager,
      determine whether the destination operand is stored in the internal cache unit, and
      transmit the operation code, the one or more source operands and the destination operand to the color processing pipeline; and
    a blend unit configured to:
      receive the operation code, one or more source operands, destination operand and an atomic flag from the color processing pipeline, wherein the atomic flag indicates that the operation code is associated with the atomic transaction,
      process the one or more source operands and the destination operand based on the operation code to produce an atomic transaction result, and
      transmit the atomic transaction result to the color processing pipeline for storage in the internal cache unit,
    wherein the color processing pipeline is configured to transmit the result of the atomic transaction to an intermediate cache unit for storage at the memory location.

10. The computing system of claim 9, wherein the distribution unit is further configured to retrieve the destination operand from the intermediate cache unit when the destination operand is not stored in the internal cache unit.

11. The computing system of claim 8, wherein the distribution unit is further configured to transmit a read request to the intermediate cache unit that requests the destination operand stored at the memory location.

12. The computing system of claim 11, wherein the color raster operations unit includes a latency buffer and the distribution unit is further configured to store the one or more source operands and the operation code in the latency buffer until the destination operand is retrieved from the memory unit.

13. The computing system of claim 9, wherein the color processing pipeline is further configured to retrieve the destination operand from the internal cache unit when the destination operand is stored in the internal cache unit.

14. The computing system of claim 9, wherein the atomic transaction is an atomic operation, and the color processing pipeline is further configured to transmit the destination operand to the memory unit for transmission to the processing unit.

15. The computing system of claim 9, wherein the blend unit is further configured to apply a blending equation to the one or more source operands and the destination operand, and wherein the blending equation includes one or more source coefficients and a destination coefficient.

16. The computing system of claim 15, wherein the blend unit is further configured to adjust the values of the one or more source operands, the destination operand, the one or more source coefficients and the destination coefficient based on the operation code.

* * * * *